J. H. CARROLL.
SANITARY BOTTLED DRINK SERVING APPARATUS.
APPLICATION FILED SEPT. 18, 1919.
1,359,328.
Patented Nov. 16, 1920.
6 SHEETS—SHEET 1.
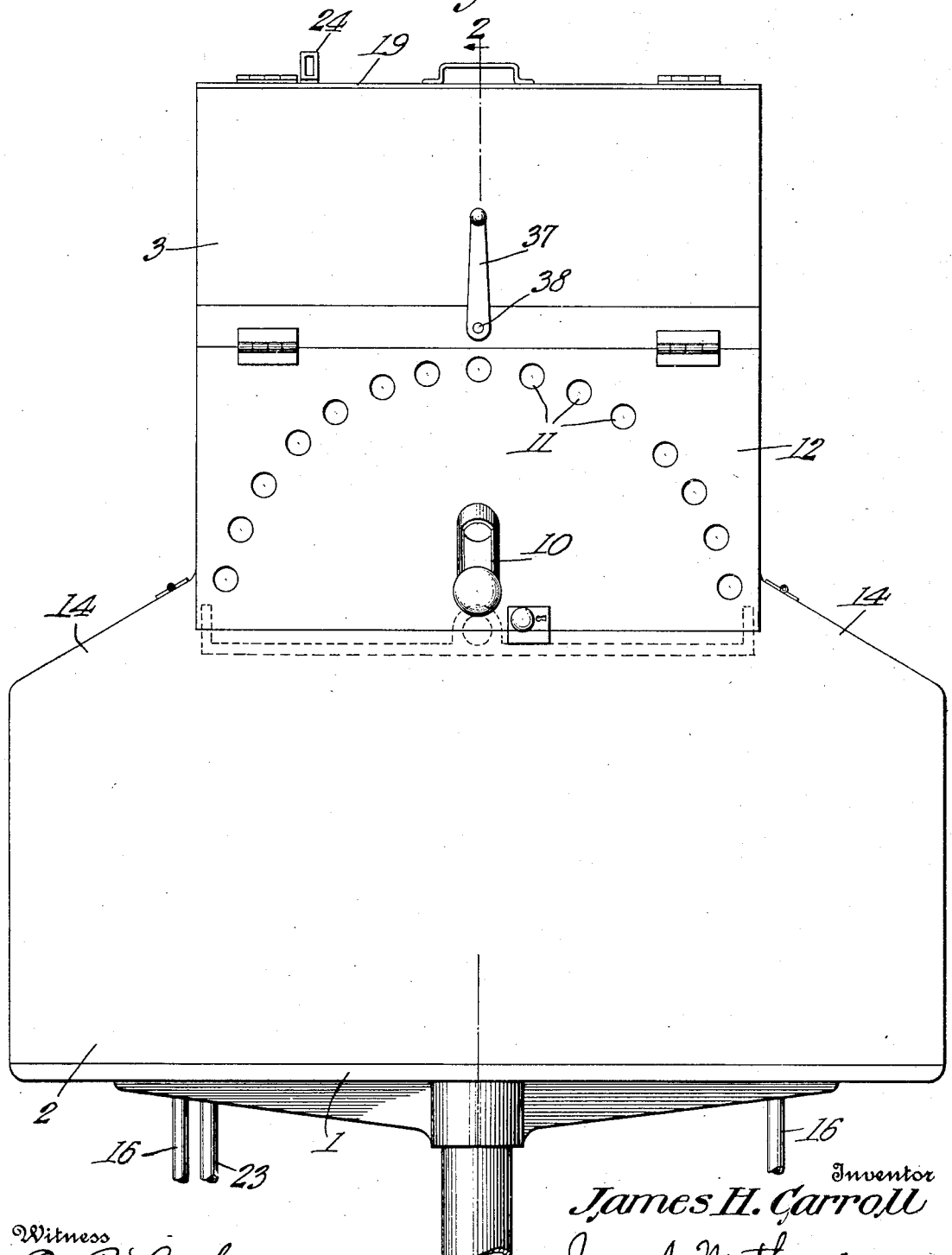

J. H. CARROLL.
SANITARY BOTTLED DRINK SERVING APPARATUS.
APPLICATION FILED SEPT. 18, 1919.
1,359,328.
Patented Nov. 16, 1920.
6 SHEETS—SHEET 2.
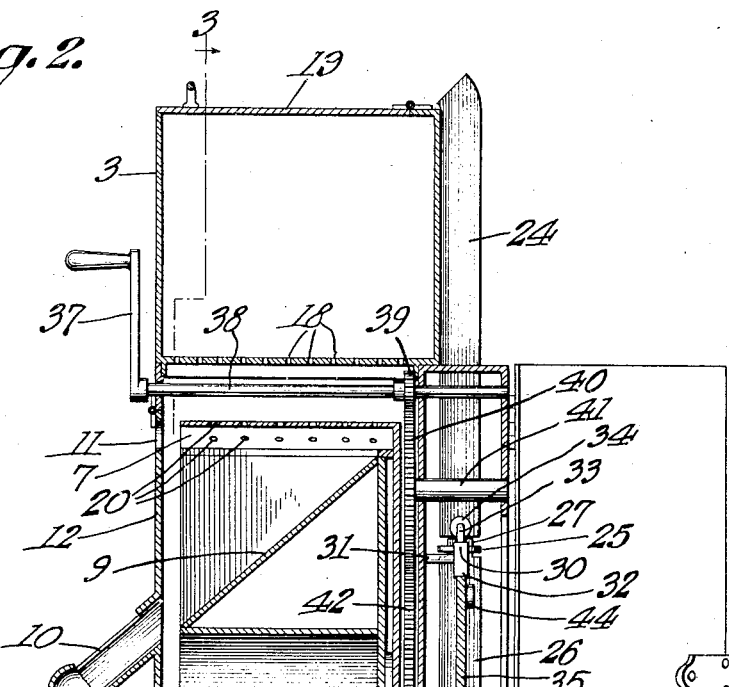
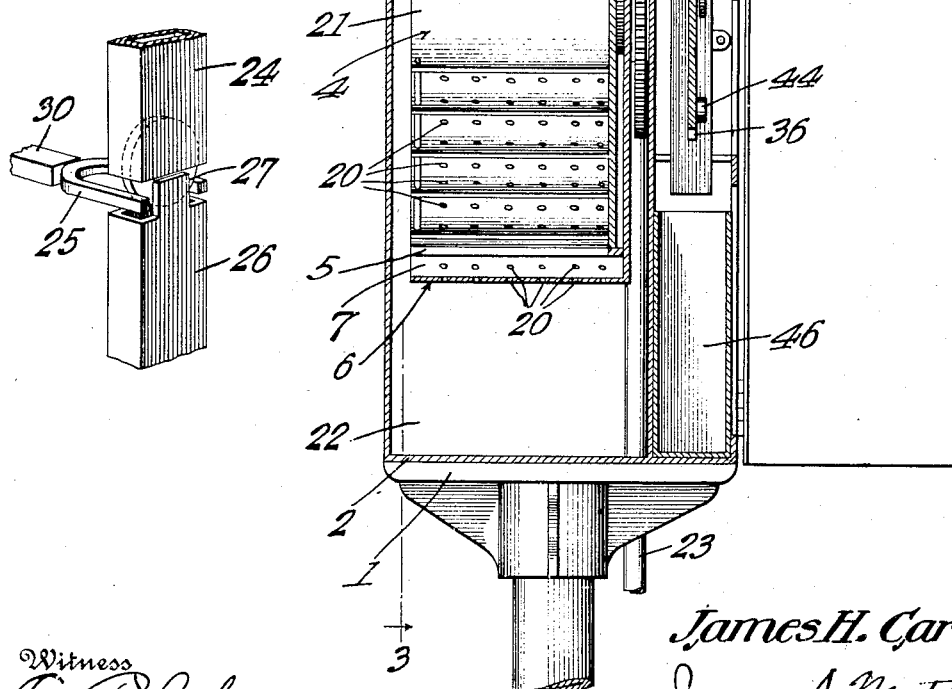

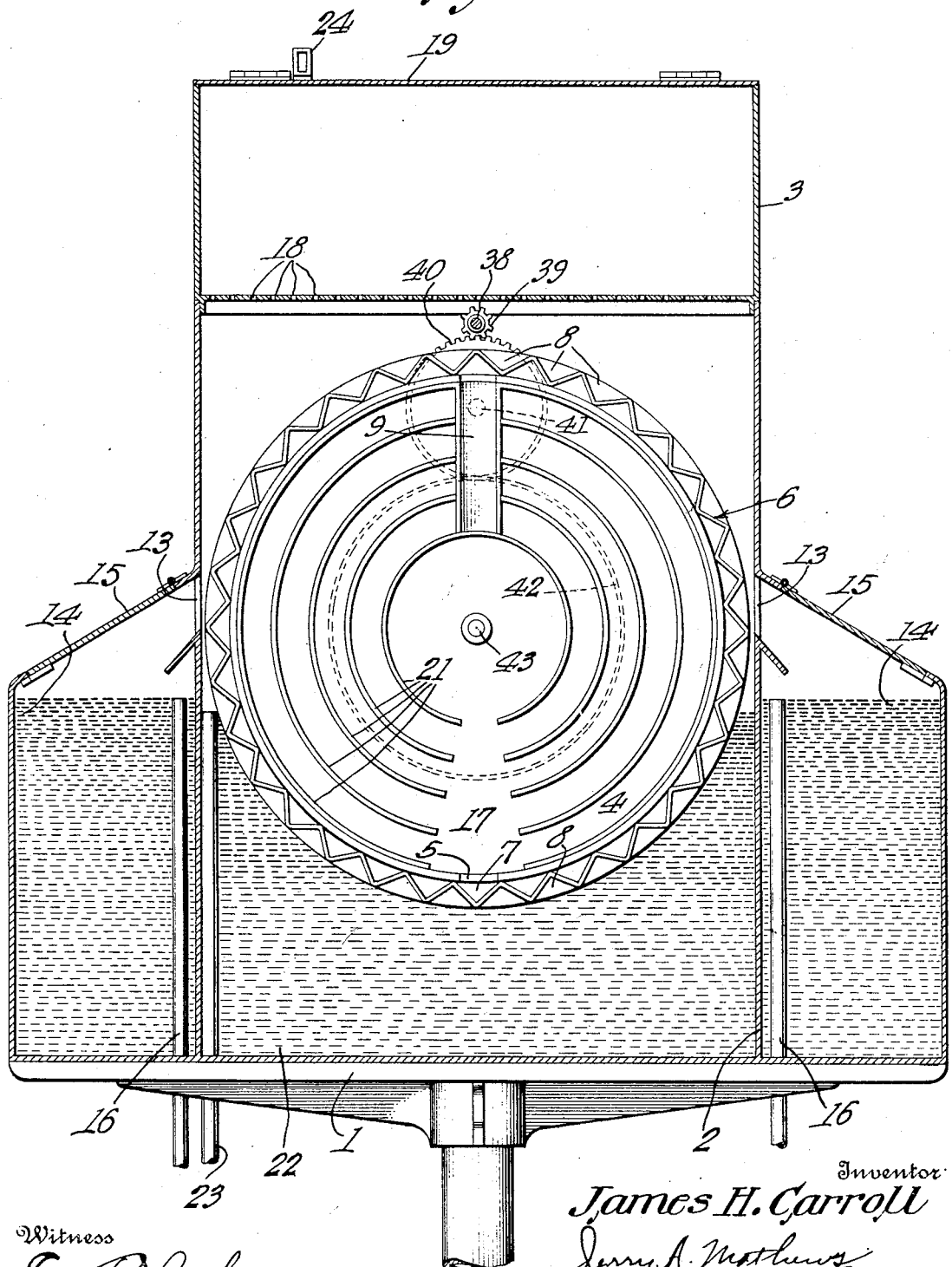

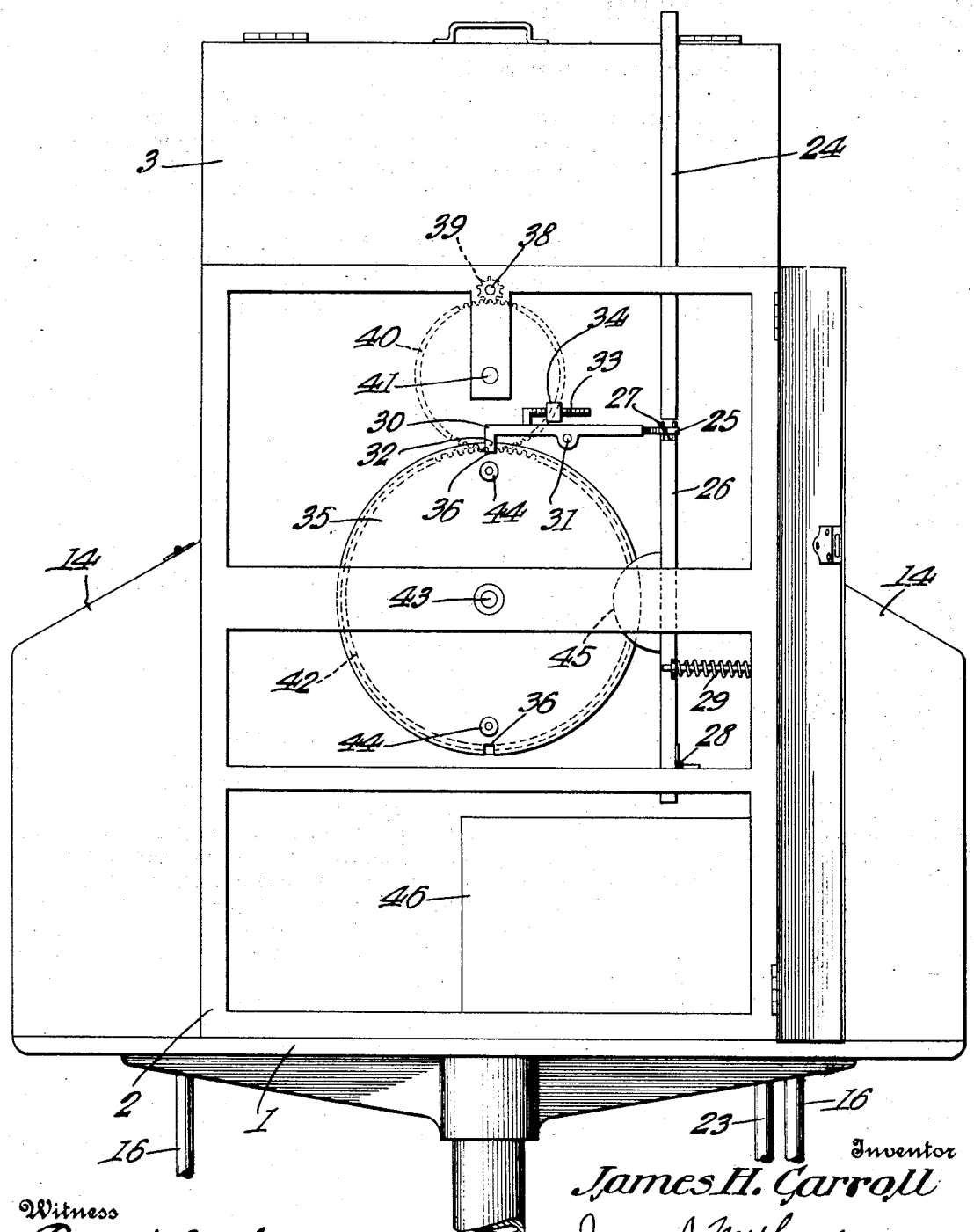

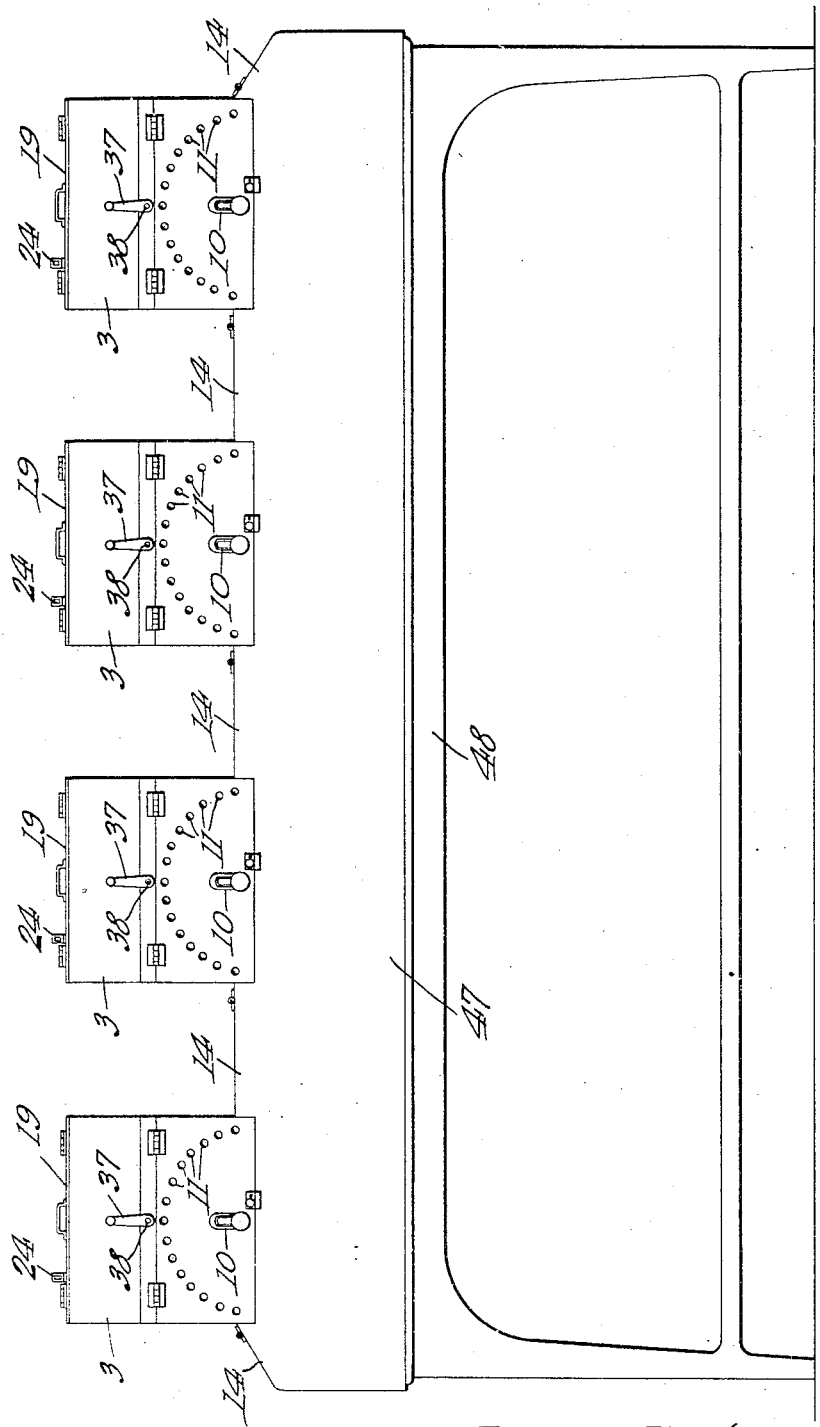

J. H. CARROLL.
SANITARY BOTTLED DRINK SERVING APPARATUS.
APPLICATION FILED SEPT. 18, 1919.
1,359,328.
Patented Nov. 16, 1920.
6 SHEETS—SHEET 6.
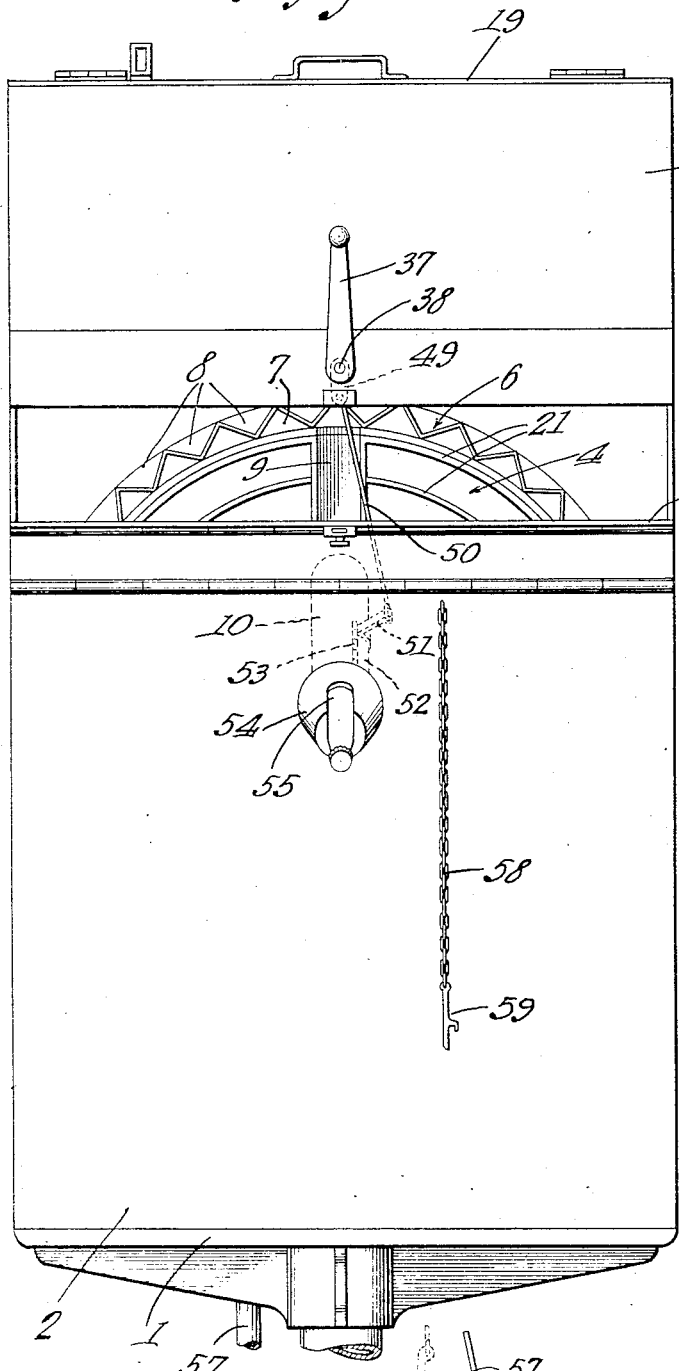
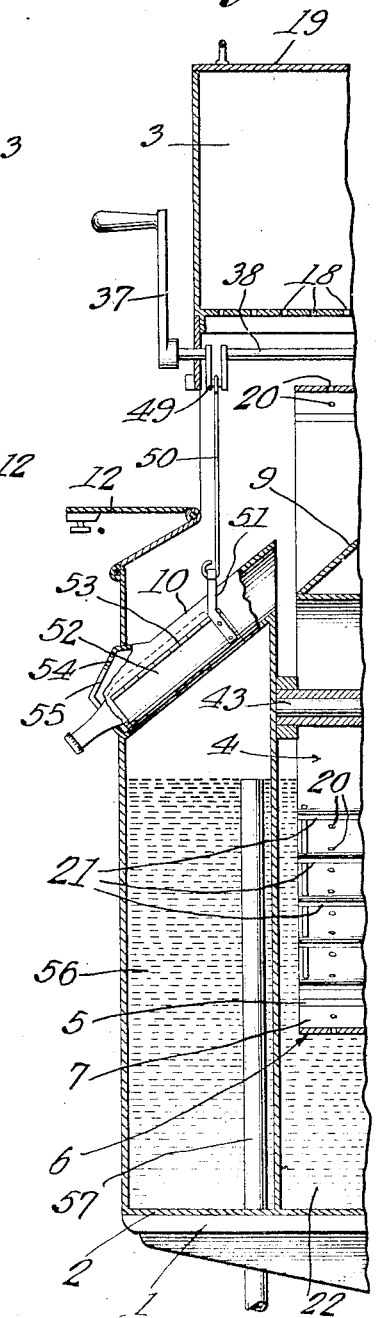
Inventor
James H. Carroll

UNITED STATES PATENT OFFICE.

JAMES H. CARROLL, OF ATLANTA, GEORGIA.

SANITARY BOTTLED-DRINK-SERVING APPARATUS.

1,359,328.   Specification of Letters Patent.   Patented Nov. 16, 1920.

Application filed September 18, 1919. Serial No. 324,636.

*To all whom it may concern:*

Be it known that I, JAMES H. CARROLL, a citizen of the United States, residing at Atlanta, in the county of Fulton and State of Georgia, have invented a new and useful Sanitary Bottled-Drink-Serving Apparatus, of which the following is a specification.

The object of my invention is to provide a bottled drink serving apparatus of novel construction, in which the handling of the bottles is performed entirely by the machine and in an improved sanitary manner, and having novel coin-operated means for actuating the device. I attain these and other objects of my invention by the mechanism illustrated in the accompanying drawings, in which—

Figure 1 is a front elevation of my invention;

Fig. 2 is a transverse vertical section on line 2—2 of Fig. 1;

Fig. 3 is a vertical section on line 3—3 of Fig. 2;

Fig. 4 is a rear elevation;

Fig. 5 is a detail perspective of members 24—27; and

Fig. 6 is a front elevation of a unit comprising four serving devices.

Fig. 7 is a front elevation showing a modified form of coin controlled mechanism.

Fig. 8 is a vertical section through the modified form shown in Fig. 7.

Fig. 9 is a sectional detail of the delivery chute and the controlling valve.

Like numerals designate like parts throughout the several views.

Referring to the accompanying drawings, I provide a base 1, on which is mounted main casing 2, on top of which is mounted an ice box 3. I provide a stationary bottle carrier 4, on which is mounted an annular corrugated rotatable conveyer 6 for conveying the bottles. I provide a bottle outlet 5 in carrier 4. The rotatable bottle conveyer 6 has inner pockets 7 and outer pockets 8. I provide a projecting delivery spout 10 by means of which the bottles are delivered to the user, the bottles being delivered by means of chute 9.

Referring to Figs. 1 and 2, I provide a plurality of round openings 11 in the door 12 of casing 2, positioned in substantial alinement with rotatable member 6, for the purpose of affording a place for the convenient disposition of empty bottles by the customer, the bottles being carried around in pockets 8 until they reach the openings or passages 13, as shown in Fig. 3, whereupon they are discharged into one of the chambers 14. Each of the chambers 14 has a lid 15 to permit of convenient access to the interior for the removal of the bottles; and the chamber is also provided with a suitable overflow pipe 16, in each instance. Member 4, as shown in Fig. 3, is provided with a plurality of concentric ribs or shelves 21 spaced sufficiently apart to receive a row of bottles between the adjacent shelves. A chamber 17, as shown in Fig. 3 is provided for the discharge of filled bottles one at a time. The base or floor of ice-box 3 is provided with perforations 18 which permit the cold water from the ice to drip down under the bottles in rotatable conveyers 6. Ice-box 3 is provided with a suitable hinged cover 19. A chamber 22 is provided for the ice water which drips down from the ice-box 3, and this chamber 22 is provided with an overflow pipe 23 of the desired height.

Referring to the views disclosing the means for operating the apparatus by means of a coin, it will be observed that I provide a coin chute 24, as shown in Fig. 2, the lower end of which is spaced slightly apart from the upper end of a second alined chute 26, which has a cutaway portion 27, to receive the tines of a fork 25 which is mounted on a latch member 30, which as shown in Fig. 4 is balanced on a pivot 31, and which has a threaded arm 33 adjustably carrying a counterweight 34, the position of which may be adjusted as required. Latch member 34 has a latch end or tongue 32 notched to engage corresponding notches in disk 35 which is released by the weight of the coin on fork 25. The lower section 26 of the coin chute is swingably mounted at its lower end by means of a suitable hinge 28, as shown in Fig. 4, and its upper ends is normally held in alinement with the upper section 24 of the coin chute by means of a suitable spring 29, which returns the chute to its former position after the fork has been released and the coin discharged through coin chute 26 into the coin receptacle 46 in the bottom of the rear part of the machine. The function of counterweight 34 is to provide convenient means for adjusting the apparatus for use with coins of different denominations and consequently of different weight. Mounted on the shaft 43 is a gear 42 which meshes with gear 40, which in turn meshes with pinion 39 mounted on shaft 38 which is operated by crank 37 to rotate the bottle carrying apparatus to a position to discharge another bottle through chute 9 into delivery spout 10. Gear 40 is mounted on a stub shaft 41, as shown in Fig. 2. Also affixed to shaft 43 I provide a disk 35 having notches 36, with which the correspondingly notched end 32 of latch 30 engages, until released by the coin.

Mounted on disk 35 I provide rollers 44 positioned to engage the cam 45 carried on the lower section 26 of the coin chute, to disengage the coin chute from its position in proximity to fork 25, whereby to allow the coin to drop through the chute and to reset the latch 30, as will be apparent by reference to Fig. 4.

Referring to Fig. 6, there is disclosed a unit containing four of the bottled drink vending machines, said unit having a main casing 47 for all the machines, said casing being mounted on a table 48.

Referring to Figs. 7 and 8, there is disclosed a modified shaft 38 carrying a crank shaft 49 to which is attached link 50 the lower end of which is attached to lever 51, as shown in dotted lines in Fig. 7, which lever is attached to a trap door 52, mounted on hinge 53, whereby to release the bottle after its contents have been withdrawn. As shown in Fig. 8 the bottle is held in inclined position with its neck projecting through slot 55 of the enlarged head 54 of chute 10. The bottle is not withdrawn by the customer from the machine, but its contents are discharged, and when a new coin is deposited and crank 37 operated it releases the bottle through the trap door 52 allowing it to drop down into the chamber 56, the trap door thereafter being closed to receive a fresh unopened bottle from chute 9. In chamber 56 I provide an overflow pipe 57 of suitable height. I also provide a chain 58 attached to some convenient portion of the machine and carrying bottle opener 59 of ordinary construction for the convenience of the customer. In this improved form of the invention the customer is not permitted to withdraw the bottle from the machine and any loss of bottles is forestalled.

Referring to Figs. 2 and 8, it will be observed that I provide a multiplicity of perforations 20 in the concentric ribs or shelves 21, and also in the rotatable bottle conveyer 6 so that the ice water which drips down to the perforations 18 in the bottom of ice-box 3 may similarly drip from shelf to shelf through perforations 20 and keep the contents of the bottles cold as long as there is ice in the ice-box.

What I claim is:

1. In a sanitary bottled drink serving apparatus, the combination of a main casing, a bottle delivery spout projecting out from said casing and having an opening of sufficient size to allow the inverted neck of the bottle to project while preventing withdrawal of the bottle from the spout, a rotatable bottle carrier mounted in the casing, a chute disposed diagonally of said bottle carrier to deliver bottles one at a time to the delivery spout, and means for keeping the bottles cold.

2. In a sanitary bottled drink serving apparatus, the combination of a main casing, a rotatable bottle carrier inaccessible to the customer, a delivery spout having an opening of sufficient size to allow the inverted neck of the bottle to project while preventing withdrawal of the bottle from the spout, means for discharging the bottles one at a time in the said delivery spout and means for maintaining a constant refrigeration of the bottles in the carrier.

3. In a sanitary bottled drink serving apparatus, the combination of a main casing, a rotatable bottle carrier inaccessible to the customer within the casing, said bottle carrier comprising a series of concentric shelves, said shelves having a multiplicity of perforations for water to pass through, a delivery chute connected with said bottle carrier, and a corrugated rotatable bottle conveyer encircling said bottle carrier, each of its corrugations being of sufficient size to pocket one bottle, the main casing having a plurality of openings alined with the rotatable bottle conveyer for the disposition of empty bottles into the outer corrugated pockets of said conveyer, and means for the discharge of bottles from the outer conveyer, substantially as set forth.

4. In a sanitary bottled drink serving apparatus, the combination of a main casing, a rotatable bottle carrier contained within said casing and having a series of concentric bottle holding shelves, said shelves having a multiplicity of perforations, a rotatable bottle discharge conveyer encircling the bottle carrier, said conveyer having pockets to receive empty bottles and other pockets for the carriage of bottles to a delivery chute, means for the delivery of the filled bottle to the customer, the main casing having openings for the disposition of empty bottles back onto the rotatable conveyer, and empty bottle discharge receptacles on either side of and positioned to receive empty bottles from the rotatable conveyer.

5. In a sanitary bottled drink serving apparatus, the combination of a main casing having an empty bottle receiving receptacle, a bottle delivery spout having an opening of sufficient size to allow the inverted neck of the bottle to project while preventing the withdrawal of the bottle from the machine by the customer, a trap door for releasing the bottle into the bottle receiving receptacle within the main casing, and means for operating said trap door.

6. In a sanitary bottled drink serving apparatus, the combination of a main casing having an empty bottle receiving receptacle, a bottle delivery spout having an opening of sufficient size to allow the inverted neck of the bottle to project while preventing the withdrawal of the bottle from the machine by the customer, a trap door on the delivery spout positioned under the bottle, a lever attached to the trap door, and means for operating the lever, whereby to deliver bottles when emptied into the receiving receptacle within the main casing and preventing the customer from carrying away empty bottles.

7. As a new article of manufacture, in a device of the class described, an inclined bottle delivery spout having a slot of sufficient size to allow the inverted neck of the bottle to project while preventing the withdrawal of the bottle from the spout, a trap door on the under side of the delivery spout for releasing the empty bottle into a receptacle inaccessible to the customer, and means for operating the trap door.

8. In combination with the device described in claim 5, the combination of a bottle carrier adapted to contain a plurality of rows of bottles and having means for discharge of said bottles one at a time to the delivery spout, and coin controlled means for releasing said bottle carrier from inoperative position upon the deposit of the required coin by the customer.

9. In combination with the device described in claim 6, the combination of a bottle carrier adapted to contain a plurality of rows of bottles and having means for discharge of said bottles one at a time to the delivery spout, and coin controlled means for releasing said bottle carrier from inoperative position upon the deposit of the required coin by the customer, said bottles however being at all times inaccessible to the customer except the neck of the bottle from which he is served and which is held in inverted position in the spout.

JAMES H. CARROLL.